3,301,830
STEROL ESTERS, METHODS FOR MAKING SAME AND USES

Richard J. Nelson, North Caldwell, N.J., and George G. Tauth, Easton, Pa., assignors to General Aniline & Film Corporation, New York, N.Y., a corporation of Delaware
No Drawing. Filed Sept. 16, 1963, Ser. No. 309,344
16 Claims. (Cl. 260—78.5)

This invention relates to new compositions of matter, methods for making same and uses thereof, and in particular to water-soluble sterol esters formed by the interaction of sterols with polymeric anhydrides and uses thereof for pharmaceutical and cosmetic purposes.

It has now been discovered that new and valuable polymeric partial esters may be prepared which are characterized by outstanding and unusual properties, and are particularly suitable as stabilizers, thickeners, and film forming materials, especially in aqueous systems.

It is therefore an object of the present invention to provide new and useful compositions of matter which have many outstanding uses.

It is still another object of the present invention to provide new and useful compositions which are derived from polymeric anhydrides and sterol compounds.

It is still another object of the present invention to provide new and useful compositions of matter which are water-soluble partial esters of polymeric anhydrides with sterol derivatives.

It is still another further object of the present invention to provide new and useful compositions of matter which are prepared by the interaction of sterol compounds and ethylenically unsaturated polymeric acid anhydrides.

It is still another further object of the present invention to provide new and useful compositions of matter which are prepared by the interaction of sterol compounds and $\alpha,\beta$-ethylenically unsaturated polymeric carboxylic acid anhydrides.

It is still another further object of the present invention to provide processes for the preparation of the aforementioned new and useful compositions of matter.

Still a further object of the present invention resides in the pharmaceutical and cosmetic use of the various aforementioned compositions of matter.

Other objects will appear hereinafter as the description proceeds.

The use of sterols, and particularly cholesterol, is well known in various pharmaceutical products for its ability to provide, among other properties, lubricity to the skin as well as stability to the various products which may be used for application to the skin. Various cholesterol derivatives are known which find outstanding utility as dispersing agents in oil and water systems, again especially in the pharmaceutical field. Such products as the condensation products of cholesterol with polyethylene glycol have been known for such purposes as disclosed in U.S. Patent 2,437,261. It has now been discovered, however, that valuable and outstanding products derived from certain sterol condensation products not only are outstanding dispersing agents for oil and water systems, but in addition they are exceptional thickening and gelling agents as well as excellent film formers.

The sterol compounds which are herein contemplated are the water-soluble alkylene oxide condensation products with sterols. The sterols are a well defined chemically recognized group of hydroxy-containing materials which have as their nucleus a cyclopentenophenanthrene ring structure. As illustrative of sterols, the following compounds may be mentioned:

| Compound: | Melting point, °C. |
|---|---|
| Cholesterol | 148 |
| Cholestanol | 142 |
| Epicholestanol | 182 |
| Coprostanol | 101 |
| Epicoprostanol | 118 |
| Isocholesterol | 75 |
| Lathosterol | 126 |
| Dihydrocholesterol | 150 |
| Ergosterol | 165 |
| Ergostanol | 144 |
| 5,6-dihydroergostanol | 173 |
| Cerevisterol | 265 |
| Zymosterol | 110 |
| Brassicasterol | 148 |
| Campesterol | 157 |
| Stigmasterol | 170 |
| Stigmastanol | 144 |
| $\beta$-Sitosterol | 140 |
| $\gamma$-Sitosterol | 148 |
| $\alpha$-Spinasterol | 172 |
| Fucosterol | 124 |
| Lanosterol | 138 |
| Agnosterol | 164 |

As pointed out above, the sterol compounds which are employed in preparing the compositions of this invention are alkylene oxide condensation products of sterols of the type above described, and such condensation products are prepared from an alkylene oxide or a precursor thereof and the selected sterol. Suitable alkylene oxides (or precursors thereof) are those having from 2 to 4 carbon atoms, such as ethylene oxide, propylene oxide, butyl oxide, butylene dioxide, isobutylene oxide, epichlorohydrin and the like. Mixtures of such oxyalkylating reagents may also be used either simultaneously or in any sequence. The general procedure for preparing such condensation products of sterols with alkylene oxides involves the interaction of the two ingredients in the presence of an alkylene material, usually under pressure. The general procedures heretofore employed in preparing alkylene oxide condensation products of reactive hydrogen compounds such as disclosed in U.S. Patents 1,970,578, 2,085,706, 2,205,021, and 2,213,477 are applicable to the preparation of the instantly contemplated sterol derivatives.

The amount of alkylene oxide employed will vary depending upon the particular oxide used and the selected sterol, but in all cases the resultant product should be one which is water-soluble at least to a limited degree. In general, at least about 4 moles of ethylene oxide per mole of sterol should be used to obtain the requisite solubility characteristics and it is preferred to employ at least about 8 moles of ethylene oxide. Since the use of propylene oxide or butylene oxide alone does not, when condensed with the sterols, yield water-soluble products, it is necessary when employing such oxides to use sufficient ethylene oxide to obtain the requisite water dispersibility. As a general guide, the sterol condensation products should contain a minimum of at least about 40% by weight condensed oxide based on the total weight of the condensation product. There is no critical upper limit of ethylene oxide but from considerations of practicability, up to about 200 moles thereof per mole of sterol may be used. The polymeric anhydrides which are contemplated for interaction with the sterol condensation products are interpolymers of at least one ethylenically unsaturated monomer with an anhydride containing an ethylenic linkage. The preferred anhydrides are the $\alpha,\beta$-unsaturated dicarboxylic acid anhydrides and particularly those of the maleic anhydride series having the formula:

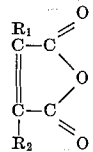

wherein $R_1$ and $R_2$ are independently selected from the group consisting of hydrogen, halogen, alkyl, aryl, aralkyl, substituted alkyl, aryl or aralkyl, or —$SO_3H$.

Examples of such compounds are:

maleic anhydride
chloromaleic anhydride
citraconic anhydride (methyl maleic)
fumaric anhydride
mesaconic anhydride
phenyl maleic anhydride
benzyl maleic anhydride
sulfomaleic anhydride
aconitic anhydride In addition, other unsaturated anhydrides such as itaconic
methylene malonic
allyl succinic, and the like may be used.

The copolymerizable monomers containing a >C=$CH_2$ group which may be employed with the above described anhydride include all of the known ethylenically unsaturated copolymerizable compounds such as:

vinyl ethers, e.g.,
    vinyl methyl ether
    vinyl ethyl ether
    vinyl n-propyl ether
    vinyl iso-propyl ether
    vinyl n-butyl ether
    vinyl iso-butyl ether
    vinyl iso-octyl ether
    vinyl phenyl ether
    α-chlorovinyl phenyl ether
    vinyl β-naphthyl ether
vinyl esters, e.g.,
    vinyl acetate
    vinyl propionate
    vinyl butyrate
    vinyl caproate
    vinyl stearate, etc.
vinyl halides, e.g.,
    vinyl chloride
    vinyl fluoride
    vinyl bromide
acrylic acid and esters, e.g.,
    methyl acrylate
    ethyl acrylate
    propyl acrylate
acrylic acid derivatives, e.g.,
    methacrylic acid and esters
    α-haloacrylic acid and esters
    acrylonitrile
    methacrylonitrile
    acrylamide
    methacrylamide
    N-alkyl acrylamides
    N-aryl acrylamides
N-vinyl heterocycles, e.g.,
    N-vinyl pyrrolidone
    N-vinyl-3-morpholinones
    N-vinyl-oxazolidone
    N-vinyl-imidazole
styrene
alkyl styrenes, e.g., α-methyl styrene
vinylidene chloride
vinyl ketones, e.g., methyl vinyl ketone
olefins such as
    ethylene
    propylene
    isobutylene
    butene-1
2,4,4-trimethyl pentene-1
hexene-1
3-methyl-butene-1, and the like The anhydride-ethylenically unsaturated interpolymers preferably contain the two moieties in equimolar amounts whereby the repeating unit in the interpolymer contains 1 anhydride and 1 comonomer moiety.

Examples of specific interpolymers which may be employed are:

vinyl methyl ether-maleic anhydride
vinyl ethyl ether-maleic anhydride
styrene-maleic anhydride
α-methyl styrene-maleic anhydride
ethylene-maleic anhydride
vinyl methyl ether-citraconic anhydride
vinyl methyl ether-itaconic anhydride
vinyl methyl ether-chlormaleic anhydride
vinyl chloride-maleic anhydride
vinyl acetate-maleic anhydride
vinyl chloride-vinyl acetate-maleic anhydride
styrene-vinyl acetate-maleic anhydride The interpolymers above described may vary in molecular weights from as low as about 400 to several million (e.g., 2,000,000) or more. Viscosity measurements are commonly used as an indication of the average molecular weight of the polymeric composition. The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945), and is defined as 1000 times $k$ in the empirical relative viscosity equation:

$$\log_{10}\eta_{rel} = \frac{75k^2}{1+1.5kC} + k$$

wherein C is the concentration in grams per hundred cc. of polymer solution and $\eta_{rel}$ is the ratio of the viscosity of the solution to that of pure solvent. The K values are reported as 1000 times the calculated viscosity coefficient in order to avoid the use of decimals. The preferred interpolymers employed in the present invention have K values of from about 10 to about 200.

K values and specific viscosities ($\eta_{sp}$) are interconvertible and are related through relative viscosity ($\eta_{rel}$). Thus, when viscosity measurements are taken on solutions which have a concentration of 1.00 gram of polymer per deciliter of solution at 25° C. (C.=1), the relationships are as follows:

$$\eta_{rel} = \eta_{sp} + 1$$

Relative viscosity—specific viscosity plus one.
Relative viscosity=$10^{(0.001K + 0.000075K^2/(1+0.0015K))}$
Hence $\eta_{sp} = -1 + 10^{(0.001K + 0.000075K^2/(1+0.0015K))}$ Relative viscosity, specific viscosity and K are dimensionless, whereas inherent viscosity $$\frac{(\log_e \eta_{rel})}{C}$$

and intrinsic viscosity (the limit of inherent viscosity as C approaches zero) have the dimensions of dilution, i.e., the reciprocal of concentration. Intrinsic viscosity and K are intended to be independent of concentration. The preferred interpolymers are those having a specific viscosity ranging from about 0.1 to about 4.5.

The oxyalkylated sterol-polymeric anhydride partial ester compositions of this invention are water-soluble products which contain up to about 25 mole percent of the total carboxyl groups present in the form of ester groups and preferably no more than about 15% as such ester groups. In order to produce partial esters of this type, several different techniques may be employed. The simplest, and the one which invariably produces water-soluble products of a low degree of esterification, involves the addition of the polymeric anhydride in a non-aqueous medium (that is, either as a solid or a non-aqueous inert carrier) to an aqueous solution or dispersion of the sterol condensation product. Since the partial esters which are to be formed are exceptional thickening agents, only such viscosity considerations govern the minimum amount of water which should be present as a carrier for the sterol condensation product. In other words, if too highly a concentrated solution of the latter is employed, then the addition of the polymeric anhydride at the initial stages of the process will cause such a degree of thickening that the reaction can hardly proceed as desired. Consequently, the minimum amount of water from such practical considerations should be about 10%. The maximum amount of water which might be used has no limit except that of course there should be present sufficient reactants to form a usable product. Again, empirically, it has been determined that one may use as much as 99.75% water, i.e., 0.25% reactants, and still obtain an aqueous mass which has been well thickened. The second variable in preparing the partial esters of this invention is the ratio of the two reactants. As little as about 0.01% on a molar basis of sterol condensate per mole of polymeric anhydride yields suitable partial esters of outstanding properties. There is no upper limit of sterol condensation in aqueous systems since water-soluble products invariably form and the excess of the condensate merely acts as a diluent.

It is also possible to prepare the novel compositions of this invention in non-aqueous systems such as acetone and the like, and in these media there is again, as the lower limit of sterol condensate, 0.01% as in the case of the aqueous systems, but the upper limit of sterol condensate which may be used in the non-aqueous technique is about 0.1 to 0.5 mole thereof per mole of interpolymer and preferably .01 to .1 to avoid overesterification.

As a modification of the procedure for forming the partial esters of this invention in aqueous systems, one may employ intermingling sprays of anhydride with sterol condensate containing very low water content. This permits the direct formulation of the partial ester in a substantially anhydrous state.

The following examples will serve to illustrate the present invention without being deemed limitative thereof. Parts are by weight unless otherwise indicated.

EXAMPLE 1

To 191 g. of water there are added with stirring 6.0 g. of a condensation product of lanolin with about 10 moles of ethylene oxide (i.e., the condensation product contains an average of 10 oxyethyl groups). The mixture is warmed to 75° C. on a steam bath and a substantially clear solution results. To this solution there is then added 3.0 g. of a medium viscosity vinyl methyl ether-maleic anhydride interpolymer (mole ratio 1:1, specific viscosity=1.6 measured as a 1 g. sample per 100 ml. of solution in 2-butanone at 25° C.). Stirring is continued until all of the polymer dissolves. This takes about 1 hour. The resulting clear solution is a viscous liquid with a viscosity of .350 cps. and contains 4.5% solids. Films are cast from this solution and dried. Such films are very flexible, soft and transparent. A portion of the solution is neutralized with 0.1 N-aqueous sodium hydroxide to a pH of 5.5. A clear gel results.

EXAMPLE 2

Example 1 is repeated except that there are employed 180 g. of water to dissolve 10 g. of the lanolin condensate and to this are added 10 g. of the interpolymer.

The resultant product contains 10% solids and is a stiff, clear gel having a viscosity greater than 100,000 cps. A portion of this gel (1 g.) is dissolved in 10 g. of hot water. Films are cast on glass from this solution and when dried, yield clear, flexible films soluble in water and an alcohol.

EXAMPLE 3

Example 1 is once again repeated except that the ingredients used are 180 g. of water to dissolve 1 g. of the sterol condensate to which is then added 2 g. of the interpolymer. The resulting solution is of low viscosity but thickens to a stiff gel on neutralizing to a pH of 5.5 as in Example 1. The un-neutralized solution is used to cast films and the dried films resulting therefrom are clear, non-tacky, very flexible and water soluble.

EXAMPLE 4

Example 1 is repeated except that only 1 g. of the sterol condensate is used and the amount of the interpolymer is increased to 8 g. The resulting solution yields clear, non-tacky films upon casting. As in Example 1, adjustment of the pH to 5.5 with sodium hydroxide or an organic amine yields a clear gel.

EXAMPLE 5

Example 1 is again repeated except that the condensation product employed is a cholesterol plus 8 moles of ethylene oxide. The resulting solution is clear and viscous, and soft, flexible films are deposited therefrom. Neutralizing the solution to a pH of 5.5 results in the formation of a clear gel.

EXAMPLE 6

Example 5 is repeated except that the condensation product is a cholesterol plus 15 moles of ethylene oxide. The results are similar to Example 5.

EXAMPLE 7

Examples 1, 5 and 6 are repeated except that the interpolymer is a vinyl ethyl ether-maleic anhydride interpolymer ($K=20$).

EXAMPLE 8

Example 7 is repeated employing as the interpolymer the following in place of the one of Example 7:

(a) Vinyl ethyl ether-maleic anhydride $K=90$
(b) Vinyl isobutyl ether-maleic anhydride $K=40$
(c) Vinyl methyl ether-chloro-maleic anhydride $K=30$
(d) Vinyl methyl ether-citraconic-anhydride $K=40$
(e) Vinyl methyl ether-methylene malonic anhydride $K=20$
(f) Vinyl methyl ether-benzyl maleic anhydride $K=35$
(g) Vinyl acetate-maleic anhydride
(h) Vinyl chloride-maleic anhydride
(i) Vinyl stearate-maleic anhydride
(j) Methyl acrylate-maleic anhydride
(k) Acrylonitrile-maleic anhydride
(l) Styrene-maleic anhydride
(m) Ethylene-maleic anhydride
(n) N-vinyl pyrrolidone-maleic anhydride
(o) Styrene-vinyl acetate-maleic anhydride The interpolymers of this example contain a comonomer in equimolar amounts.

EXAMPLE 9

Examples 5 and 6 are repeated using the weight ratios of Examples 2, 3 and 4, i.e., 1:1, 2:1, and 8:1 of interpolymer to ethylene oxide condensate.

EXAMPLE 10

Examples 5 and 9 are repeated employing the following alkylene oxide condensates:

(a) cholestanol+E.O.[1]
(b) cholestanol+12 E.O.

---
[1] E.O.=ethylene oxide.

(c) cholestanol+E.O.
(d) cholestanol+50 E.O.
(e) stigmasterol+10 E.O.
(f) γ-sitosterol+8 E.O.
(g) γ-sitosterol+15 E.O.
(h) lathosterol+40 E.O.
(i) lathosterol+80 E.O.
(j) β-sitosterol+8 E.O.
(k) β-sitosterol+25 E.O.
(l) β-sitosterol+60 E.O.
(m) β-sitosterol+100 E.O.
(n) β-sitosterol+200 E.O.

EXAMPLE 11

Example 10 is repeated employing the interpolymers of Examples 7 and 8 in place of the vinyl methyl ether-maleic anhydride interpolymer.

The product of Example 1 has about 14.5% ester groups (i.e. 14.5% of total carboxyl groups as ester groups) as determined by ultraviolet spectrophotometry of chloroform extracted product.

The product of Example 2 has about 16% ester groups, that of Example 3 about 10%, and that of Example 4 about 5% ester groups.

EXAMPLE 12

Examples 5 and 9 are again repeated employing the following 1:1 interpolymers:

(a) vinyl methyl ether-chloromaleic anhydride ($K=90$)
(b) vinyl methyl ether-chloromaleic anhydride ($K=60$)
(c) citraconic anhydride-vinyl methyl ether ($K=50$)
(d) benzyl maleic anhydride-vinyl methyl ether ($K=20$)
(e) methylene malonic anhydride-vinyl methyl ether ($K=30$)
(f) itaconic anhydride-vinyl methyl ether ($K=50$)

EXAMPLE 13

6 g. of a soya bean sterol (mixture of stigmasterol and γ-sitosterol) oxyalkylated with 8 moles of ethylene oxide is dissolved in 191 g. of acetone. The solution is warmed to about 90° F. and 0.1 g. of a powder of a 1:1 interpolymer of isobutyl vinyl ether with maleic anhydride (specific viscosity=1.8) are stirred into this solution. After solution is complete, clear, flexible films are deposited therefrom. The degree of esterification is about 25%.

EXAMPLE 14

Example 13 is repeated employing oxyalkylated products as follows: "sterol" is that of Example 13.

(a) sterol+12 moles ethylene oxide
(b) sterol+15 moles ethylene oxide
(c) sterol+30 moles ethylene oxide
(d) sterol+4 moles propylene oxide, then 6 moles ethylene oxide
(e) sterol+6 moles butylene oxide, then 12 moles ethylene oxide

EXAMPLE 15

The procedure of Example 1 is again repeated employing the oxyalkylated sterols of Examples 1, 5, 6, 10, 13 and 14 employing, however, the following ratios of polymeric anhydride to sterol compound on a molar basis:

(a) 10:1
(b) 100:1
(c) 1000:1
(d) 1,000:1
(e) 10,000:1
(f) 1:10
(g) 1:100
(h) 1:1000

Since the mole weight of the sterol condensate will, obviously, vary with the degree of oxyalkylation, the following general guide will be useful in determining amounts to be used on a weight basis. In the following table are listed moles of ethylene oxide and the corresponding ratio (on a weight basis) of equimolar amounts of vinyl methyl ether-maleic anhydride interpolymer and the oxyalkylated sterol.

Table I

| Moles ethylene oxide: | Weight ratio of equimolar amounts (Sterol/interpolymer) |
|---|---|
| 2 | 3:1 |
| 5 | 4:1 |
| 8 | 4.7:1 |
| 10 | 5.3:1 |
| 15 | 7:1 |
| 20 | 8:1 |
| 40 | 14:1 |
| 50 | 17:1 |
| 80 | 25:1 |
| 100 | 31:1 |
| 200 | 60:1 |

Further, the above is based upon cholesterol. Other sterols vary slightly in molecular weight and therefore, the ratios will vary slightly, accordingly. Thus sitosterol, which has an empirical formula of $C_{29}H_{49}OH$, has a molecular weight of about 415. With 10 moles of ethylene oxide, the weight ratio of equimolar amounts, as in Table I, is about 5.5:1. Similarly with other polymeric anhydrides, this ratio will vary, too. The unit molecular weight of the methyl vinyl ether-maleic anhydride interpolymer is 156. That of the isobutyl vinyl ether interpolymer is 198. With the latter the ratios are 2.4, 3.0 and 4.1 for the 2, 5 and 10 mole ethylene oxide condensates, respectively.

EXAMPLE 16

A solution of 0.2 g. of the sterol condensate of Example 1 in 5 g. of water is added to 20 g. of the interpolymer of Example 1 and agitated in a Werner Pfleiderer mill overnight. A dry, partial ester (8.5% carboxyls esterified) is produced.

EXAMPLE 17

200 g. of solution of partial ester are prepared as in Example 1. To 20 g. of this solution are added 0.4 g. of polyvinylpyrrolidone ($K=30$) and the pH is adjusted to 5 by the addition of aqueous sodium hydroxide. A clear gel results which has excellent lubricity and makes an outstanding hair pomade.

As pointed out above, either water or an inert non-aqueous carrier, i.e., acetone, may be used as the reaction medium. It is also possible to employ alcohols but this must be carefully controlled to prevent over-esterification with the alcohol. Thus, dissolving the interpolymers in lower alcohols such as methanol and ethanol results in the half-ester upon dissolution or shortly thereafter. The higher alcohols require heat and/or acid catalysts to form even partial esters. With heat and acid catalyst esterification can be made to go to substantially 100%. Consequently, in employing alcohol as the solvent medium, it is necessary to control the degree of esterification so that only water-soluble products are formed. This can best be accomplished with aqueous-alcohol solutions. The following examples will illustrate the above techniques.

EXAMPLE 18

Example 1 is repeated except that methanol is used in lieu of water, the temperature is 40° C. in place of 75° C. The final product contains 40% ester groups of which 38.5% are methyl ester groups and 1.5% are lanolin condensate moieties.

EXAMPLE 19

Example 1 is repeated except that 100 g. of water and 91 g. of methanol are used in place of 191 g. of water.

The final product contains 1.8% lanolin condensate moieties and 25% methyl ester groups.

EXAMPLE 20

Example 19 is repeated using ethanol in place of methanol. The final product contains 22% ethyl ester groups and 1.8% lanolin condensate moieties.

EXAMPLE 21

Example 19 is repeated using isopropanol. The final product contains 10% isopropyl ester groups and 2% lanolin condensate moieties.

EXAMPLE 22

10 g. of the lanolin condensate of Example 1 is dissolved in 130 g. of acetone at room temperature. 10 g. of the interpolymer of Example 1 are then added. A clear solution results. Soft, flexible, non-tacky films are cast from this solution. The films are slowly soluble in water.

EXAMPLE 23

To a solution of 6 g. of the lanolin condensate of Example 1 in 191 g. of water at 90° C. there are added 10 g. of mineral oil with vigorous stirring. There are then stirred in 3 g. of the interpolymer of Example 1. The mixture is neutralized to pH=6 with 1 N aqueous NaOH. A creamy gel results which is an excellent hand lotion.

Other variations in and modifications of the described processes which will be obvious to those skilled in the art can be made in this invention without departing from the scope or spirit thereof.

We claim:
1. A water-soluble partial ester of
  (a) an oxyalkylated sterol containing at least about 40% by weight condensed alkylene oxide of from 2 to 4 carbon atoms, and
  (b) an alkali-soluble interpolymer of an $\alpha,\beta$-unsaturated carboxylic anhydride with a monoethylenically unsaturated monomer selected from the group consisting of alkyl vinyl ethers, olefins, styrene, vinyl esters, acrylic acid and acrylic acid derivatives, the said components of the interpolymer being present in approximately equimolar quantities and in alternating repetitive arrangement, said partial ester containing not more than about 25% of the carboxyl group present as ester groups of the oxyalkylated sterol.

2. An ester as defined in claim 1 wherein the anhydride is maleic anhydride.

3. An ester as defined in claim 2 wherein the monomer is an alkyl vinyl ether.

4. An ester as defined in claim 2 wherein the monomer is methyl vinyl ether.

5. An ester as defined in claim 2 wherein the monomer is an olefin.

6. An ester as defined in claim 2 wherein the monomer is ethylene.

7. An ester as defined in claim 2 wherein the monomer is styrene.

8. An ester as defined in claim 2 wherein the monomer is a vinyl ester.

9. An ester as defined in claim 2 wherein the monomer is an acrylic acid derivative.

10. An ester as defined in claim 1 wherein the sterol is cholesterol.

11. An ester as defined in claim 1 wherein the oxyalkylated sterol is an oxyethylated sterol.

12. An ester as defined in claim 11 wherein the oxyethylated sterol is oxyethylated cholesterol.

13. An ester as defined in claim 12 wherein the oxyethylated cholesterol contains at least about 8 moles of ethylene oxide per mole of cholesterol.

14. An ester as defined in claim 13 wherein the interpolymer is a methyl vinyl ether and maleic anhydride interpolymer in equimolar amounts.

15. An ester as defined in claim 1 wherein the oxyalkylated sterol is an oxyethylated cholesterol containing at least about 8 oxyethyl groups, the interpolymer is a methyl vinyl ether-maleic anhydride (1:1) interpolymer and the degree of esterification is less than about 15% of the total carboxyl groups.

16. A process for preparing partial esters as defined in claim 1 which comprises adding the interpolymer to an aqueous dispersion of the oxyalkylated sterol, the latter being present in an amount of at least 0.01 mole percent based on total moles of reactants.

References Cited by the Examiner

UNITED STATES PATENTS

| | | | |
|---|---|---|---|
| 2,565,147 | 8/1951 | Pfluger | 260—78.5 |
| 2,892,736 | 6/1959 | Johnson et al. | 260—78.5 |
| 2,997,464 | 8/1961 | Sellers | 260—78.5 |
| 3,190,855 | 6/1965 | Mike | 260—63 |

OTHER REFERENCES

Dissertation abstracts, William F. Hedd, Jr., vol. 18, 73, 1958.

JOSEPH L. SCHOFER, *Primary Examiner.*

L. WOLF, L. G. CHILDERS, *Assistant Examiners.*